United States Patent

Green

[15] 3,653,673
[45] Apr. 4, 1972

[54] GASKETS

[72] Inventor: Dermot Green, Cheltenham, England

[73] Assignee: Dowty Seals Limited, Ashchurch, Tewkesbury, Gloucestershire, England

[22] Filed: Nov. 2, 1970

[21] Appl. No.: 85,979

[30] Foreign Application Priority Data

Nov. 19, 1969 Great Britain......................56,613/69

[52] U.S. Cl.............................................277/227, 277/211
[51] Int. Cl.........................................................F16j 15/10
[58] Field of Search.............277/209, 211, 207, 227, 235 R, 277/235 B

[56] References Cited

UNITED STATES PATENTS 2,058,010  10/1936  Fitch..................................277/235 B
2,681,241  6/1954  Aukers..............................277/235 B Primary Examiner—Robert I. Smith
Attorney—Young & Thompson

[57] ABSTRACT

A gasket suitable for use with a gasketed joint assembly having a strip of a sealant material extending from part of an area subjected in use to high loading to another part of that area or to a part of another area subjected to use to high loading.

12 Claims, 6 Drawing Figures

PATENTED APR 4 1972 3,653,673

INVENTOR
DERMOT GREEN
BY Young & Thompson
ATTORNEYS

GASKETS

This invention relates to gasketed joint assemblies of the kind comprising two parts which are secured together with a surface of one part opposed to a surface of the other part. At least one of the parts has therein a fluid-carrying passageway opening into its said surface. In order to prevent leakage of fluid between the opposed surfaces, a gasket is fitted between the two opposed surfaces. The gasket may or may not have an aperture which co-operates with the passageway in the one part. Such a gasketed joint assembly is herein referred to as "a gasketed joint assembly of the kind stated." In a gasketed joint assembly of the kind stated, the area of the gasket in the region of a device used to secure the parts together (e.g., a bolt) is subjected to higher loading than the other areas of the gasket.

The invention also relates to a gasket suitable for use in a gasketed joint assembly of the kind stated and to methods of making such gaskets.

It is one object of this invention to provide an efficient gasketed joint assembly and also a gasket suitable for use with such an assembly.

According to this invention a gasket suitable for use with a gasketed joint assembly of the kind stated comprises in its free state a base of substantially-uniform thickness with a strip of sealant material on a surface thereof extending from one part of an area of the base to be subjected in use to high loading to another part of the said area, whereby the strip and the part of the said area between the ends of the strip act as an uninterrupted seal for a passageway of a joint part when assembled between the joint parts.

Also, according to this invention, a gasket suitable for use with a gasketed joint assembly of the kind stated comprises in its free state a base of substantially-uniform thickness with strips of sealant material on a surface thereof, each strip extending from part of an area of the base to be subjected in use to high loading to a part of an adjacent area of the base also to be subjected in use to high loading, whereby the strips and each part of each said area between adjacent ends of two strips act as an uninterrupted seal for a passageway of a joint part when assembled between the joint parts.

The strip of sealant material may gradually change in thickness and/or width from each end to a maximum thickness and/or width intermediate the ends.

The material of the gasket base and its thickness will be chosen so that, under the load applied, sufficient compression of the material in the highly-loaded areas will occur to ensure adequate sealing. Furthermore, the material and thickness are such that little or no flow will occur in those areas due to the changing mechanical and thermal conditions which arise during use. Thus little or no so-called torque-loss will occur and consequently adequate sealing in these parts of the gasket will be maintained in use. Two of the many suitable materials for the gasket base are paper and asbestos.

At other parts of the gasketed joint where, in use, deflections and distortions may occur, adequate sealing will be maintained by the strip or strips of sealant material which merge at the ends into the highly-loaded areas.

Thus a continuous seal is maintained around the passageway although the strip (or strips) of sealant material is (are) not continuous around the passageway in a part of the joint.

Each strip of material may conveniently, but not necessarily, be deposited on the gasket base by a screen-printing process. The surface tensional effects which arise during such a process provide a deposit which varies in thickness with respect to width and thus a strip having the shape required for the gasket is readily produced.

The strip or strips of material may be deposited on one side only of the base or on both sides of the base.

In some embodiments of the invention, there will be a passageway in only one of the parts, and the gasket may or may not have a corresponding aperture.

In other embodiments of the invention, there will be a passageway in one part which is to be joined to a passageway in the other part. The gasket will then have an aperture which allows fluid to flow from the passageway in one part to the passageway in the other part. Such a gasket may have a pair of holes adjacent the periphery of the aperture through which devices, e.g., bolts, may be passed to secure the two parts together. Such a gasket will have two strips of sealant material about the aperture, the ends being separated by the area of the gasket base in the region of the holes.

In further embodiments of the invention, each part will have several passageways and the other part will have co-operating passageways. The gasket will then have several apertures and some at least of the apertures may have an adjacent hole through which a securing device may pass. An aperture so associated with a hole will have a single strip of material thereabout, extending from one position near to the hole to another position near to the hole.

Several gaskets in accordance with the invention will now be described by way of example with reference to the accompanying drawings.

Figure 1:
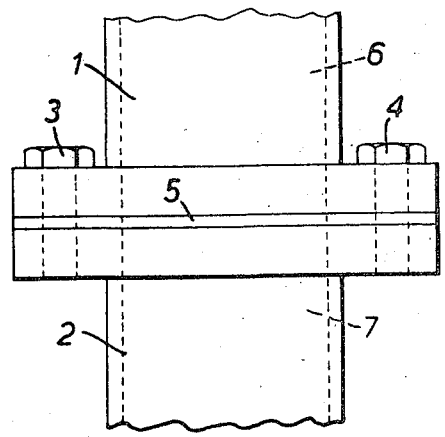
FIG. 1 is an elevational view of a gasketed joint assembly.

Referring to FIGS. 1 to 4 of the accompanying drawings, the gasketed joint assembly includes two parts 1 and 2 which are joined together by two bolts 3 and 4 (which are threaded into part 2) and are separated by a gasket 5. Each part, 1 and 2, has aligned fluid-carrying passageways 6 and 7.

The gasket 5 comprises a base 8 of substantially constant thickness. The base has an aperture 9 which, when the gasket is assembled in the joint, will be aligned with the two passageways 6 and 7. The base also has two bolt holes 10 and 11 which, when the gasket is assembled in the joint, will be aligned with the bolts 3 and 4.

Two strips 12 and 13 of sealant material are deposited by a screen-printing process onto one of the surfaces of the base. The strip 12 emerges from the area of the base adjacent the bolt hole 10, follows the periphery of the aperture 9 and merges into the area adjacent the bolt hole 11. The strip 13 emerges from another part of the area adjacent the bolt hole 11, follows the periphery of the aperture 9 and merges into another part of the area adjacent the bolt hole 10.

Figure 2:
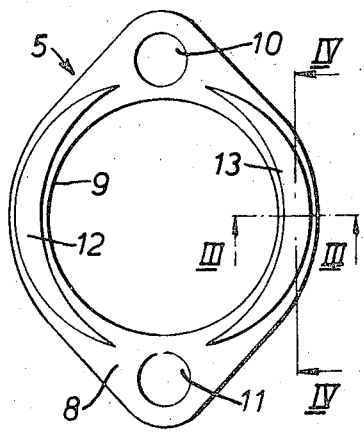
FIG. 2 is a plan view of a gasket suitable for use with the joint of FIG. 1.
Figure 3:
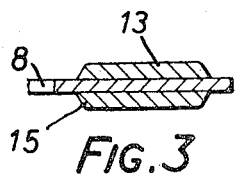
FIG. 3 is a sectional view, on an enlarged scale, taken along the line III — III of FIG. 2.
Figure 4:
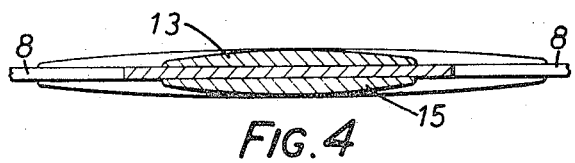
FIG. 4 is a sectional view, on an enlarged scale, taken along the line IV — IV of FIG. 2.

Two further strips 14 and 15 of sealant material are deposited by a screen-printing process onto the other of the surfaces of the base, their dispositions and shapes being the same as those of the strips shown in FIG. 2.

The areas from which the strips emerge and into which they merge are areas which, in the assembled gasketed joint, are subjected to high loading by reason of the bolted connections. The areas between the adjacent ends of the strips are also subjected to high loading when assembled and the two strips and the parts of the areas between adjacent ends of the strips act as an uninterrupted seal for the passageways 6 and 7.

Furthermore in this embodiment, each strip gradually changes in thickness (see FIG. 4) from each end, being at a maximum about half way between its ends. Thus the parts are capable of the small deflections which occur in use in the areas remote from the bolts, and the varying strip thickness accommodates these deflections.

Figure 5:
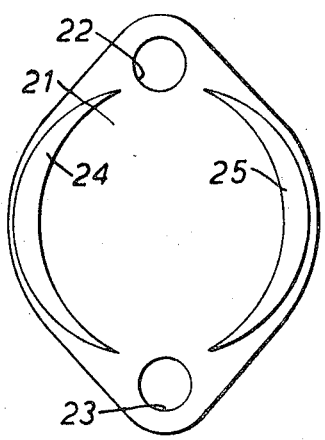
FIG. 5 is a plan view of a gasket suitable for use with another gasket joint assembly.

The gasket shown in FIG. 5 is suitable for use in a gasketed joint where only one of the parts has a passageway. Such a gasket and the associated part which does not have a passageway thus act to blank-off the end of the passageway in the other part. This gasket, except for the fact that it lacks an aperture, is the same as that shown in FIG. 2 and comprises a base 21, bolt holes 22 and 23 and strips of sealant material 24 and 25. The undersurface of the gasket has further strips which correspond to those shown in FIG. 5.

Figure 6:
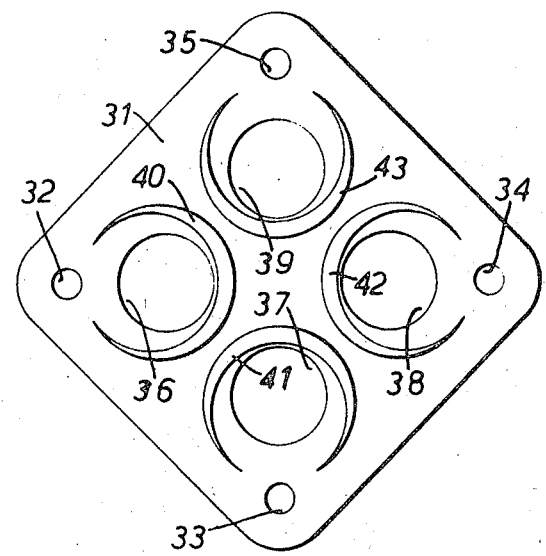
FIG. 6 is a plan view of a gasket suitable for use with yet another gasket joint assembly.

The gasket shown in FIG. 6 is suitable for use in a gasketed joint where each part has four fluid-carrying passageways.

The gasket comprises a base 31, four bolt holes 32, 33, 34 and 35, four apertures 36, 37, 38 and 39 and four strips of sealant material 40, 41, 42 and 43 which are deposited thereon by, say, a screen-printing process.

Each strip, as is readily seen in the FIG. 6, emerges from one part of an area adjacent a bolt hole which, when assembled in a gasketed joint, is subjected to high loading, extends for an appreciable distance about the periphery of the aperture adjacent that hole, and finally merges into another part of the area from which it emerges.

The undersurface of the base 31 also has four strips of sealant material which correspond to the strips 40, 41, 42 and 43. Each strip and the part of the area between the ends of the strip act as an uninterrupted seal when the gasket is assembled in a joint. Thus each of the four passageways is sealed against leakage from a passage.

Many materials may be employed for the sealant strip or strips and, when a screen-printing process is used for deposition thereof on the base of a gasket, the materials will be in a condition suitable for screen-printing. Examples of such materials are epoxy-resin compositions, urethanes and silicones.

Although in the embodiments described above, each surface of the base has strips, in other embodiments the strips are only provided on one of its surfaces.

I claim as my invention:

1. A gasket, suitable for use with a gasketed joint assembly of the kind stated, comprising in its free state a base of substantially-uniform thickness with a strip of sealant material on a surface thereof extending from one part of an area of the base to be subjected in use to high loading to another part of the said area, whereby the strip and the part of the said area between the ends of the strip act as an uninterrupted seal for a passageway of a joint part when assembled between the joint parts.

2. A gasket as claimed in claim 1 wherein a strip changes in thickness from each end thereof, having a maximum thickness intermediate its ends.

3. A gasket as claimed in claim 1 wherein a strip changes in width from each end thereof, having a maximum width intermediate its ends.

4. A gasket as claimed in claim 1 wherein a strip changes in thickness and in width from each end thereof, having a maximum thickness and a maximum width intermediate its ends.

5. A gasket as claimed in claim 1 in which the strip is screen-printed on the base.

6. A gasketed joint assembly of the kind stated having a gasket as claimed in claim 1.

7. A gasket, suitable for use with a gasketed joint assembly of the kind stated, comprising in its free state a base of substantially-uniform thickness with strips of sealant material on a surface thereof, each strip extending from part of an area of the base to be subjected in use to high loading to a part of an adjacent area of the base also to be subjected in use to high loading, whereby the strips and each part of each said area between adjacent ends of two strips act as an uninterrupted seal for a passageway of a joint part when assembled between the joint parts.

8. A gasket as claimed in claim 7 wherein a strip changes in thickness from each end thereof, having a maximum thickness intermediate its ends.

9. As gasket as claimed in claim 7 wherein a strip changes in width from each end thereof, having a maximum width intermediate its ends.

10. A gasket as claimed in claim 7 wherein a strip changes in thickness and in width from each end thereof, having a maximum thickness and a maximum width intermediate its ends.

11. A gasket as claimed in claim 7 in which the strips are screen-printed on the base.

12. A gasketed joint assembly of the kind stated having a gasket as claimed in claim 7.

* * * * *